United States Patent
Chen (10) Patent No.: US 11,288,058 B2
(45) Date of Patent: Mar. 29, 2022

(54) INTERNET OF THINGS DEVICE, A SERVER, AND A SOFTWARE UPDATING METHOD

(71) Applicant: HON HAI PRECISION INDUSTRY CO., LTD., New Taipei (TW)

(72) Inventor: Wen-Ruei Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/067,731

(22) Filed: Oct. 11, 2020

(65) Prior Publication Data
US 2021/0373874 A1  Dec. 2, 2021

(30) Foreign Application Priority Data
Jun. 2, 2020 (CN) .......................... 202010490683.9

(51) Int. Cl.
G06F 8/65 (2018.01)
G16Y 40/10 (2020.01)
H04L 67/125 (2022.01)
H04L 29/06 (2006.01)

(52) U.S. Cl.
CPC ............... G06F 8/65 (2013.01); G16Y 40/10 (2020.01); H04L 63/0442 (2013.01); H04L 67/125 (2013.01)

(58) Field of Classification Search
CPC ..... H04L 63/0442; H04L 67/125; G06F 8/61; G06F 8/65; G16Y 40/10
See application file for complete search history.

(56) References Cited

U.S. PATENT DOCUMENTS

| | | | |
|---|---|---|---|
| 6,792,474 B1* | 9/2004 | Hopprich | H04L 29/12283 370/392 |
| 10,091,242 B2* | 10/2018 | Britt | H04L 63/061 |
| 10,855,478 B2* | 12/2020 | Lu | H04L 9/3278 |
| 2019/0141017 A1* | 5/2019 | Carrel | H04L 67/104 |

FOREIGN PATENT DOCUMENTS

| | | |
|---|---|---|
| TW | 201705781 | 2/2017 |
| TW | 201929482 | 7/2019 |

OTHER PUBLICATIONS

Witanto et al. "A Blockchain-Based OCF Firmware Update for IoT Devices", Published: Sep. 26, 2020, Applied Science, Retrieved from <https://www.researchgate.net/publication/345786343_A_Blockchain-Based_OCF_Firmware_Update_for_IoT_Devices>, pp. 1-22. (Year: 2020).*

* cited by examiner

*Primary Examiner* — Marina Lee
(74) *Attorney, Agent, or Firm* — ScienBiziP, P.C.

(57) ABSTRACT

A software updating method is applied in a device governing an internet of things (IoT). A public key of a server and software updating information of an adjacent device is broadcast as control information by the server, the IoT device encrypts the software updating information according to the public key of the adjacent device, sends the encrypted software updating information to the adjacent device, and downloads software updating information from the adjacent device. When the control information includes address for storing the software in the server and the software updating information of the adjacent device, the IoT device downloads the software corresponding to the software updating information from the adjacent device.

14 Claims, 7 Drawing Sheets

INTERNET OF THINGS DEVICE, A SERVER, AND A SOFTWARE UPDATING METHOD

CROSS-REFERENCE TO RELATED APPLICATIONS

This application claims priority to Chinese Patent Application No. 202010490683.9 filed on Jun. 2, 2020, the contents of which are incorporated by reference herein.

FIELD

The subject matter herein generally relates to communications field, especially relates to an Internet of things (IOT) device, a server, and a software updating method.

BACKGROUND

In the prior art, centralized software updates for Internet of Things, IOT (IoT) devices require a large number of servers to provide updating services, but building so many servers increases costs. In addition, in order to achieve low energy consumption and low cost, IoT devices are often connected with each other in the form of mesh/tree, and IoT devices may not be connected to the server at all time. Connectivity between the IoT devices and the server is thus limited, resulting in inconvenience in updating the software of IoT devices from the server.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

Exemplary embodiments of the present disclosure will be described in relation to the accompanying drawings.

Figure 1:
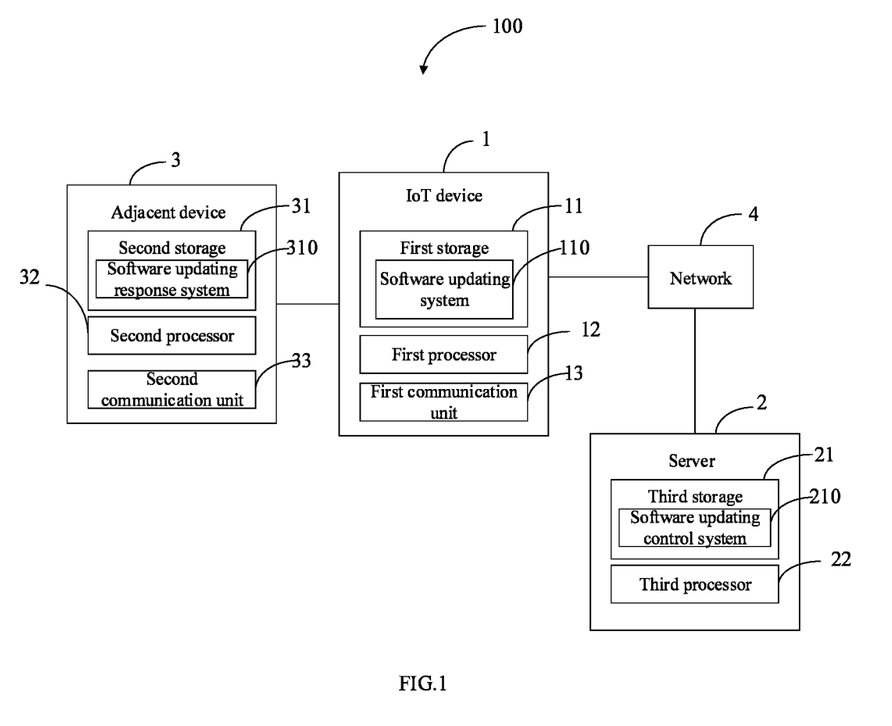
FIG. 1 is a block diagram of one embodiment of a running environment of a software updating system for IOT device.

FIG. 1 illustrates a running environment of a software updating system 100 for IOT device. The software updating system 100 includes an IOT device as a requester of a software update, a server 2 as a controller of the software update, and an adjacent device 3 as the provider of the software update. In one embodiment, the server 2 is used to control the IoT device 1 to download software update from adjacent device 3 around the IoT device 1.

In one embodiment, the IoT device 1 and the adjacent device 3 can be a personal computer, a mobile phone, a tablet, a home phone, a home TV, a home refrigerator, and other terminal device. It should be noted that the adjacent device 3 refers to a device in the same broadcast area as IoT device 1 by physical transmission media. In one embodiment, server 2 can be a single server, a server cluster, or a cloud server.

In one embodiment, the IoT device 1 includes a first storage 11, at least one first processor 12, and a first communication unit 13. The first processor 12 connects to the first storage 11 and the first communication unit 13. The adjacent device 3 includes a second storage 31, at least one second processor 32, and a second communication unit 33. The second storage 31 connects to the second processor 32 and the second communication unit 33. The IoT device 1 communicates with the adjacent device 3 by the first communication unit 13 and the second communication unit 33. In one embodiment, the first communication unit 13 and the second communication unit 33 can be wired communication modules, such as by cables. In another embodiment, the first communication unit 13 and the second communication unit 33 can be wireless communication modules, such as WI-FI communication modules, 4G-5G communication modules, etc. In one embodiment, the server 2 includes a third storage 21 and at least a third processor 22. The third processor 22 connects to the third storage 21. In one embodiment, the IoT device 1 communicates with the server 2 by a network 4. In one embodiment, the network can be a wired network or a wireless network, such as a radio network, a WI-FI network, a cellular network, a satellite network, a broadcast network, etc.

It should be noted that the structures of IoT device 1, the server 2 and the adjacent device 3 shown in FIG. 1 do not constitute a limitation of the embodiments of the present disclosure, and the IoT device 1, the server 2, and the adjacent device 3 may include more or less hardware and software or other than as shown in FIG. 1, or they may have different component arrangements.

In one embodiment, the first storage 11, the second storage 31 and the third storage 21 may be used to store program code and various data of the computer program. For example, the first storage 11 can be used to store a software updating system 110 for IoT device 1. The third storage 21 can be used to store the software updating control system 210 installed in the server 2. The second storage 31 can be used to store the software updating response system 310 installed in the adjacent device 3. It should be noted that the software updating system 110 for the IoT device 1, the software updating control system 210, and the software updating response system 310 can also be integrated into a single system.

In one embodiment, the first storage 11, the second storage 31, and the third storage 21 can be a read-only memory, a programmable read-only memory, an erasable programmable read-only memory, an one-time Programmable Read-Only Memory, an Electronic Eraseable Programmable Read-Only Memory, a Compact Disc Read-Only Memory, or other optical memory, a disk memory, a tape memory, or any other non-volatile computer readable storage medium that can be used to carry or store data.

In one embodiment, the first processor 12, the second processor 32, and the third processor 22 can respectively be composed of integrated circuits. In one embodiment, the first processor 12, the second processor 32, and the third processor 22 can be a central processing unit (CPU), a microprocessor, a digital signal processor, an application processor, a modem processor, or an integrated processor with an application processor and a modem processor integrated inside.

In one embodiment, the first processor 12 is a control unit of the IoT device 1, using various interfaces and lines to connect the various components of the IoT device 1, by executing programs or modules or instructions stored in the first storage 11, and invoking the data stored in the first storage 11 to perform various functions and data processing of the IoT device 1, for example, to perform software updating function.

In one embodiment, the third processor 22 is a control unit of the server 2, using various interfaces and lines to connect the various components of the server 2, by executing programs or modules or instructions stored in the third storage 21, and invoking the data stored in the third storage 21 to perform various functions and data processing of the server 2, for example, to perform function of controlling software updating.

In one embodiment, the second processor 32 is a control unit of the adjacent device 3, using various interfaces and lines to connect the various components of the adjacent device 3, by executing programs or modules or instructions stored in the second storage 31, and invoking the data stored in the second storage 31 to perform various functions and data processing of the adjacent device 3, for example, to perform responses made to software updating function.

Figure 2:
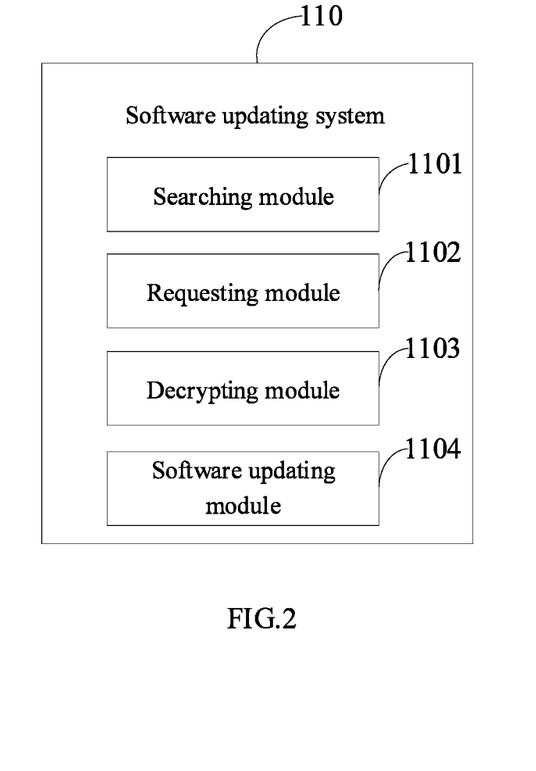
FIG. 2 is a block diagram of an embodiment of the software updating system for IOT device of FIG. 1.

The software updating system 110 for IoT device 1 includes one or more modules, stored in the first storage 11, and performed by at least one or more processors (for example, the first processor 12) to perform software updating function. FIG. 2 illustrates the software updating system 110. The software updating system 110 includes a searching module 1101, a requesting module 1102, a decrypting module 1103, a software updating module 1104. The modules 1101-1104 of the disclosure can be a series of computer-readable instruction segments that are executed the first processor 12, and are stored in the first storage 11.

In one embodiment, the searching module 1101 broadcast to search information of the adjacent device 3 around the IOT device 1.

In one embodiment, the information of the adjacent device 3 includes, but is not limited to, identification number of the adjacent device 3, software version information, and service status. The service status indicates whether the adjacent device 3 has a function for providing software updates. In one embodiment, the service status includes a first status and a second status. The first status is that the adjacent device 3 has the function for providing software update, and the second status is that the adjacent device 3 has no function for providing software updates.

The requesting module 1102 obtains information of the IoT device 1, encrypts the information of the IoT device 1 and the information of the adjacent device 3 in a first encryption mode to obtain encrypted information of the IoT device 1 and encrypted information of the adjacent device 3, and sends the encrypted information of the IoT device 1 and the encrypted information of the adjacent device 3 to the server 2. In one embodiment, the information of the IOT device 1 includes, but is not limited to, identification number of the IoT device 1

In one embodiment, the requesting module 1102 encrypts the information of the IoT device 1 according to a public key of the server 2 to obtain the encrypted information of the IoT device 1. The requesting module 1102 encrypts the information of the adjacent device 3 according to the public key of the server 2 to obtain the encrypted information of the adjacent device 3. The requesting module 1102 further sends the encrypted information of the IoT device 1 and the encrypted information of the adjacent device 3 to the server 2. The server 2 determines whether the adjacent device 3 has a function for providing software update according to the information of the adjacent device 3 to obtain a determining result, and generates control information according to the determining result, and sends the control information to the IoT device 1.

In one embodiment, when the determining result is that the adjacent device 3 has the function for providing software update, the server 2 generates the control information containing the public key of the server 2 and software updating information of the adjacent device 3, and sends the control information to the IoT device 1. When the determining result is that the adjacent device 3 has no function for providing software update, the server 2 generates the control information containing an address for storing the software in the server 2 and the software updating information of the adjacent device 3, and sends the control information to the IoT device 1.

The decrypting module 1103 decrypts the control information sent by the server 2 and determines whether the control information includes the public key of the server 2 and the software updating information of the adjacent device 3, or includes the address information that storing the software in the server 2 and the software updating information of the adjacent device 3. In one embodiment, decrypting module 1103 decrypts the control information sent by the server 2 according to a private key of the server 2.

In one embodiment, when the control information includes the public key of the server 2 and the software updating information of the adjacent device 3, the software updating module 1104 encrypts the software updating information according to the public key of the adjacent device 3 to obtain encrypted software updating information, sends the encrypted software updating information to the adjacent device 3, and downloads the software corresponding to the software updating information from the adjacent device 3.

When the control information includes the address information that storing the software in the server 2 and the software updating information of the adjacent device 3, the software updating module 1104 downloads the software corresponding to the software updating information from the adjacent device 3.

Figure 3:
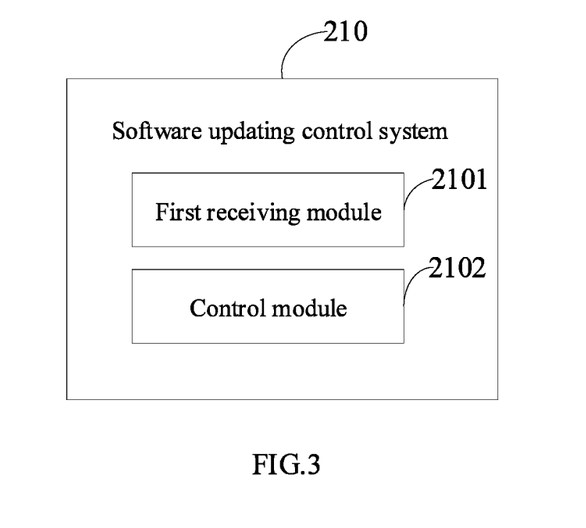
FIG. 3 is a block diagram of an embodiment of a software updating control system of FIG. 1.

The software updating control system 210 includes one or more modules, stored in the third storage 21, and performed by at least one or more processors (for example, the third processor 22) to perform software update control function. FIG. 3 illustrates the software updating control system 210. The software updating control system 210 includes a first receiving module 2101, and a control module 2102. The modules 2101-2102 of the disclosure can be a series of computer-readable instruction segments that are executed the third processor 22, and are stored in the third storage 21.

The first receiving module 2101 receives the information of the IoT device 1 and the information of the adjacent device 3 sent by the IoT device 1, and determines whether the adjacent device 3 is a target device according to the information of the adjacent device 3.

In one embodiment, the first receiving module 2101 determines whether the adjacent device 3 is registered in the server 2 according to the information of the adjacent device 3. When the adjacent device 3 is registered in the server 2, the first receiving module 2101 determines that the adjacent device 3 is the target device. When the adjacent device 3 is not registered in the server 2, the first receiving module 2101 determines that the adjacent device 3 is not the target device.

When the adjacent device 3 is the target device, the control module 2102 determines whether the adjacent device 3 has the function for providing software update according to the software version information of the adjacent device 3 and the service status of the adjacent device 3. When the adjacent device 3 has the function for providing software update, the control module 2102 sends the public key of the adjacent device 3 and the software updating information in a second encryption mode to the IoT device 1. In one embodiment, when the adjacent device 3 has the function for providing software update, the control module 2102 encrypts the public key of the adjacent device 3 and the software updating information by the public key of the server 2 to obtain the encrypted public key of the adjacent device 3 and the encrypted software updating information, and sends the encrypted public key of the adjacent device 3 and the encrypted software updating information to the IoT device 1.

When the adjacent device 3 is not the target device or the adjacent device 3 has no function for providing software update, the control module 2102 sends the address information that storing the software in the server 2 and the software updating information of the adjacent device 3 in the second encryption mode to the IoT device 1.

Figure 4:
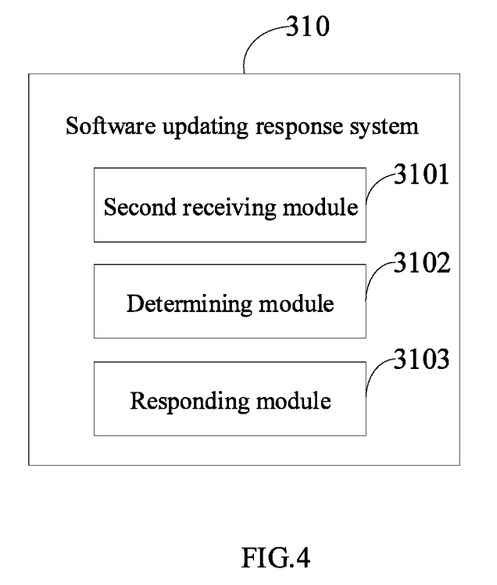
FIG. 4 is a block diagram of an embodiment of a software updating response system of FIG. 1.

In one embodiment, a system for confirming software updates of IoT devices (software updating response system 310) includes one or more modules, stored in the second storage 31, and performed by at least one or more processors (for example, the second processor 32) to perform function of controlling software updates. FIG. 4 illustrates the software updating response system 310. The software updating response system 310 includes a second receiving module 3101, a determining module 3102, and a responding module 3103. The modules 3101-3103 of the disclosure can be a series of computer-readable instruction segments that are executed the second processor 32, and are stored in the second storage 31.

In one embodiment, the second receiving module 3101 receives the encrypted software updating information encrypted by the public key of the adjacent device 3 sent by the IoT device 1, and decrypts the encrypted software updating information by the private key decryption of adjacent device 3 to obtain the software updating information.

The determining module 3102 determines whether the software updating information is correct.

When the software updating information is correct, the responding module 3103 sends the software corresponding to the software updating information to the IoT device 1.

Figure 5:
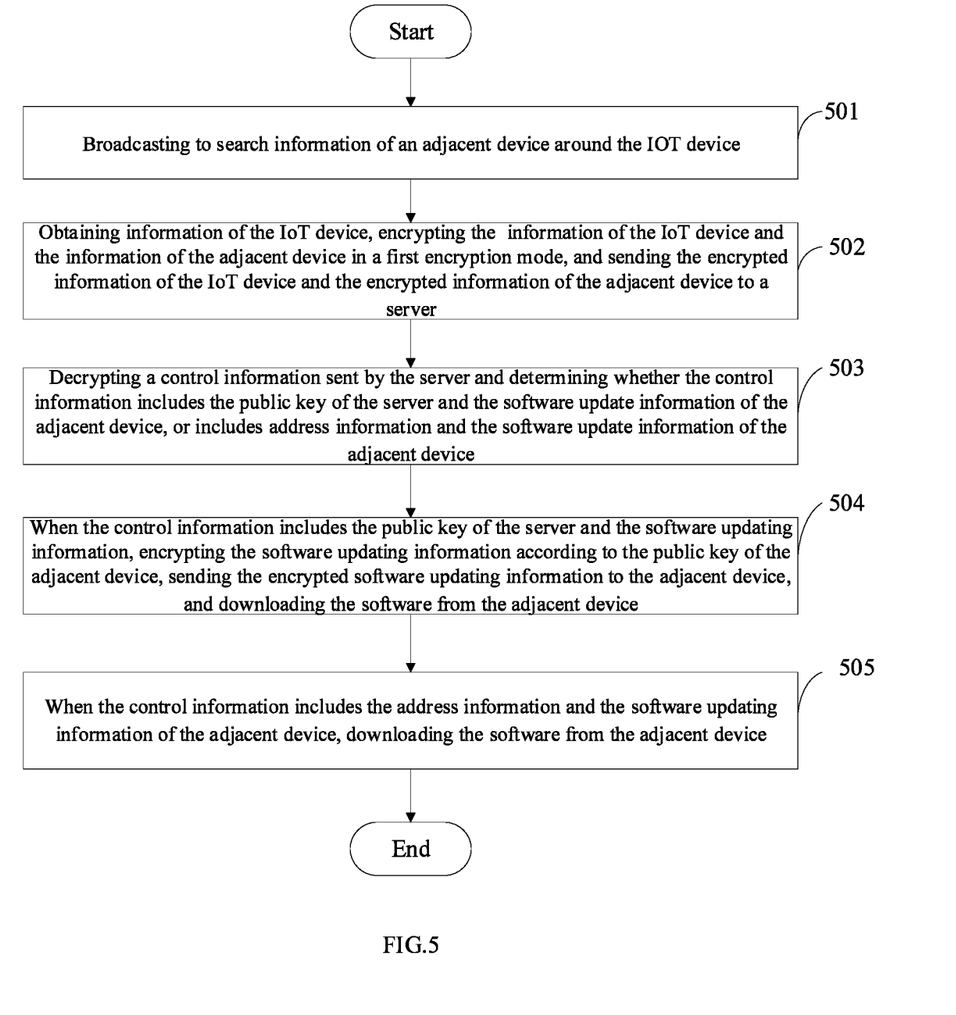
FIG. 5 illustrates a flowchart of one embodiment of a software updating method.

FIG. 5 illustrates a flowchart of one embodiment of a software updating method. The method is applied in an TOT device. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 501.

At block 501, the TOT device broadcast, to search information of an adjacent device around the TOT device.

In one embodiment, the information of the adjacent device includes, but is not limited to, identification number of the adjacent device, software version information, and a service status. The service status indicates whether the adjacent device has a function for providing software update. In one embodiment, the service status includes a first status and a second status. The first status is that the adjacent device has the function for providing software update, and the second status is that the adjacent device has no function for providing software update.

At block 502, the IOT device obtains information of the IoT device, encrypts the information of the IoT device and the information of the adjacent device in a first encryption mode to obtain encrypted information of the IoT device and encrypted information of the adjacent device, and sends the encrypted device information of the IoT device and the encrypted device information of the adjacent device to a server. In one embodiment, the information of the IOT device includes, but is not limited to, identification number of the IoT device 1

In one embodiment, the IOT device encrypts the information of the IoT device according to a public key of the server to obtain the encrypted information of the IoT device. The IOT device encrypts the information of the adjacent device according to the public key of the server to obtain the encrypted information of the adjacent device. The IOT device further sends the encrypted information of the IoT device and the encrypted information of the adjacent device to the server 2. The server determines whether the adjacent device has a function for providing software update according to the information of the adjacent device to obtain a determining result, and generates control information according to the determining result, and sends the control information to the IoT device.

In one embodiment, when the determining result is that the adjacent device has the function for providing software update, the server generates the control information containing the public key of the server and software update information of the adjacent device, and sends the control information to the IoT device. When the determining result is that the adjacent device has no function for providing software update, the server generates the control information containing address information that storing the software in the server and the software updating information of the adjacent device, and sends the control information to the IoT device.

At block 503, the TOT device decrypts the control information sent by the server and determines whether the control information includes the public key of the server and the software updating information of the adjacent device, or includes the address information that storing the software in the server and the software updating information of the adjacent device.

In one embodiment, the TOT device decrypts the control information sent by the server according to a private key of the server.

At block 504, when the control information includes the public key of the server and the software updating information of the adjacent device, the TOT device encrypts the software updating information according to the public key of the adjacent device to obtain encrypted software updating information, sends the encrypted software updating information to the adjacent device, and downloads the software corresponding to the software updating information from the adjacent device.

At block 505, when the control information includes the address information that storing the software in the server and the software updating information of the adjacent device, the TOT device downloads the software corresponding to the software updating information from the adjacent device.

Figure 6:
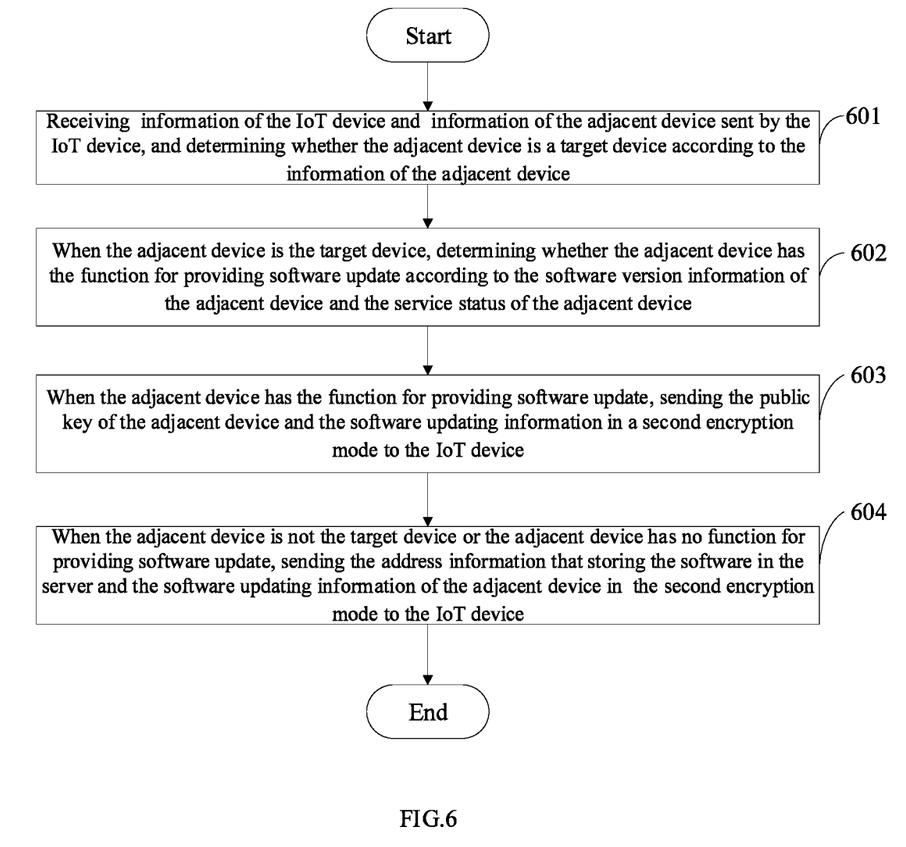
FIG. 6 illustrates another flowchart of one embodiment of a software updating method.

FIG. 6 illustrates a flowchart of one embodiment of a method for applying software updates to IoT devices. The method is applied in the server. The example method can begin at block 601.

At block 601, the server receives information of the IoT device and information of the adjacent device sent by the IoT device, and determines whether the adjacent device is a target device according to the information of the adjacent device.

In one embodiment, the server determines whether the adjacent device is registered in the server according to the information of the adjacent device. When the adjacent device is registered in the server, the server determines that the adjacent device is the target device. When the adjacent device is not registered in the server, the server determines that the adjacent device is not the target device.

At block 602, when the adjacent device is the target device, the server determines whether the adjacent device has the function for providing software update according to the software version information of the adjacent device and the service status of the adjacent device.

At block 603, when the adjacent device has the function for providing software update, the server sends the public key of the adjacent device and the software updating information in a second encryption mode to the IoT device.

In one embodiment, when the adjacent device has the function for providing software update, the server encrypts the public key of the adjacent device and the software updating information by the public key of the server to obtain the encrypted public key of the adjacent device and the encrypted software updating information, and sends the encrypted public key of the adjacent device and the encrypted software updating information to the IoT device.

At block 604, when the adjacent device is not the target device or the adjacent device has no function for providing software update, the server sends the address information that storing the software in the server and the software updating information of the adjacent device in the second encryption mode to the IoT device.

Figure 7:
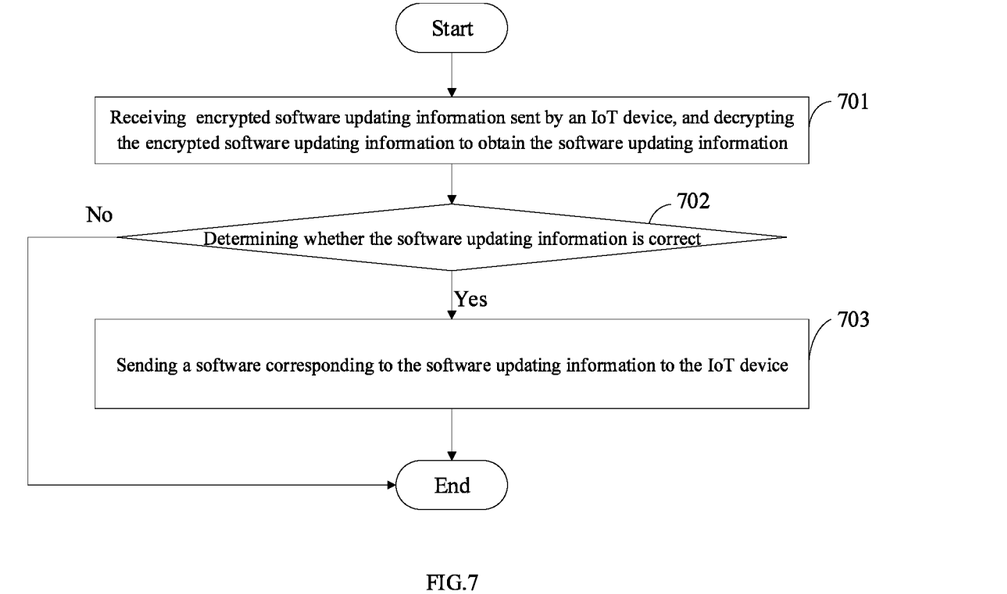
FIG. 7 illustrates another flowchart of one embodiment of a software updating method.

FIG. 7 illustrates a flowchart of one embodiment of a software updating method. The method is applied in the adjacent device. The example method can begin at block 701.

At block 701, the adjacent device receives the encrypted software updating information encrypted by the public key of the adjacent device sent by the IoT device, and decrypts the encrypted software updating information by the private key decryption of adjacent device to obtain the software updating information.

At block 702, the adjacent device determines whether the software updating information is correct.

At block 703, when the software updating information is correct, the adjacent device sends the software corresponding to the software updating information to the IoT device.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. An Internet of things (IoT) device comprising:
a processor; and
a non-transitory storage medium coupled to the processor and configured to store a plurality of instructions, which cause the processor to:
broadcast to search information of an adjacent device around the IoT device;
obtain information of the IoT device, encrypt the information of the IoT device and the information of the adjacent device in a first encryption mode and obtain encrypted information of the IoT device and encrypted information of the adjacent device, and send the encrypted information of the IoT device and the encrypted information of the adjacent device to a server; and
decrypt control information sent by the server and determine whether the control information comprises a public key of the server and software updating information of the adjacent device, or the control information comprises address information that storing a software in the server and the software updating information of the adjacent device, wherein
if the control information comprises the public key of the server and the software updating information of the adjacent device, encrypt the software updating information according to the public key of the adjacent device and obtain encrypted software updating information, send the encrypted software updating information to the adjacent device, and download the software corresponding to the software updating information from the adjacent device, and
if the control information comprises the address information and the software updating information of the adjacent device, download the software corresponding to the software updating information from the adjacent device.

2. The Internet of things device according to claim 1, wherein the information of the adjacent device comprises an identification number of the adjacent device, software version information and a service status, the service status indicates whether the adjacent device has a function for providing software update.

3. The Internet of things device according to claim 2, wherein the service status comprises a first status and a second status, the first status is that the adjacent device has the function for providing software update, and the second status is that the adjacent device has no function for providing software update.

4. The Internet of things device according to claim 1, wherein the plurality of instructions are further configured to cause the processor to:
   encrypt the information of the IoT device according to a public key of the server to obtain the encrypted information of the IoT device; and
   encrypt the information of the adjacent device according to the public key of the server to obtain the encrypted information of the adjacent device.

5. The Internet of things device according to claim 1, wherein the plurality of instructions are further configured to cause the processor to:
   decrypt the control information sent by the server according to a private key of the server.

6. A server comprising:
   a processor; and
   a non-transitory storage medium coupled to the processor and configured to store a plurality of instructions, which cause the processor to:
      receive information of an Internet of things (IoT) device and information of an adjacent device sent by the IoT device, and determine whether the adjacent device is a target device according to the information of the adjacent device, wherein the information of the adjacent device comprises identification number of the adjacent device, software version information and a service status; and
      if the adjacent device is the target device, determine whether the adjacent device has a function for providing software update according to the software version information of the adjacent device and the service status of the adjacent device, wherein
         if the adjacent device has the function for providing software update, send a public key of the adjacent device and software updating information of the adjacent device in a second encryption mode to the IoT device; and
         if the adjacent device is not the target device or the adjacent device has no function for providing software update, send address information that storing a software in the server and the software updating information of the adjacent device in the second encryption mode to the IoT device.

7. The server according to claim 6, wherein the plurality of instructions are further configured to cause the processor to:
   If the adjacent device has the function for providing software update, encrypt the public key of the adjacent device and the software updating information by the public key of the server to obtain an encrypted public key of the adjacent device and an encrypted software updating information, and send the encrypted public key of the adjacent device and the encrypted software updating information to the IoT device.

8. A software updating method comprising:
   broadcasting to search information of an adjacent device around an Internet of things (IoT) device;
   obtaining information of the IoT device, encrypting the information of the IoT device and the information of the adjacent device in a first encryption mode to obtain encrypted information of the IoT device and encrypted information of the adjacent device, and sending the encrypted information of the IoT device and the encrypted information of the adjacent device to a server; and
   decrypting control information sent by the server and determining whether the control information comprises a public key of the server and software updating information of the adjacent device, or the control information comprises address information that storing a software in the server and the software updating information of the adjacent device, wherein
      if the control information comprises the public key of the server and the software updating information of the adjacent device, encrypting the software updating information according to the public key of the adjacent device to obtain encrypted software updating information, sending the encrypted software updating information to the adjacent device, and downloading the software corresponding to the software updating information from the adjacent device, and
      if the control information comprises the address information and the software updating information of the adjacent device, downloading the software corresponding to the software updating information from the adjacent device.

9. The software updating method according to claim 8, wherein the information of the adjacent device comprises identification number of the adjacent device, software version information and a service status, the service status indicates whether the adjacent device has a function for providing software update.

10. The software updating method according to claim 9, wherein the service status comprises a first status and a second status, the first status is that the adjacent device has the function for providing software update, and the second status is that the adjacent device has no function for providing software update.

11. The software updating method according to claim 8 further comprising:
    encrypting the information of the IoT device according to a public key of the server to obtain the encrypted information of the IoT device; and
    encrypting the information of the adjacent device according to the public key of the server to obtain the encrypted information of the adjacent device.

12. The software updating method according to claim 8 further comprising:
    decrypting the control information sent by the server according to a private key of the server.

13. A software updating method comprising:
    receiving information of an internet of things (IoT) device and information of an adjacent device sent by the IoT device, and determining whether the adjacent device is a target device according to the information of the adjacent device, wherein the information of the adjacent device comprises identification number of the adjacent device, software version information and a service status; and if the adjacent device is the target device, determining whether the adjacent device has a function for providing software update according to the software version information of the adjacent device and the service status of the adjacent device, wherein
  if the adjacent device has the function for providing software update, sending a public key of the adjacent device and software updating information of the adjacent device in a second encryption mode to the IoT device; and
if the adjacent device is not the target device or the adjacent device has no function for providing software update, sending address information that storing a software in the server and the software updating information of the adjacent device in the second encryption mode to the IoT device.

14. The software updating method according to claim 13 further comprising:
  if the adjacent device has the function for providing software update, encrypting the public key of the adjacent device and the software updating information by the public key of the server to obtain an encrypted public key of the adjacent device and encrypted software updating information, and sending the encrypted public key of the adjacent device and the encrypted software updating information to the IoT device.

\* \* \* \* \*